US010155414B2

(12) United States Patent
Bleau et al.

(10) Patent No.: US 10,155,414 B2
(45) Date of Patent: Dec. 18, 2018

(54) WHEELCHAIR CASTER ASSEMBLY

(71) Applicant: MOTION COMPOSITES INC., Saint-Roch-de-l'Achigan (CA)

(72) Inventors: Alexandre Bleau, Lachenaie (CA); Michael Archambault, Saint-Roch-de-l'Achigan (CA); Pierre-Andre Couture, Laval (CA); Alec Stephani, Saint-Lambert (CA); Maxime Lamarre, Terrebonne (CA); David Gingras, L'Assomption (CA)

(73) Assignee: MOTION COMPOSITES INC., Saint-Roch-de-l'Achigan (CA)

( * ) Notice: Subject to any disclaimer, the term of this patent is extended or adjusted under 35 U.S.C. 154(b) by 0 days.

(21) Appl. No.: 15/446,640

(22) Filed: Mar. 1, 2017

(65) Prior Publication Data

US 2017/0253081 A1   Sep. 7, 2017

Related U.S. Application Data

(60) Provisional application No. 62/310,036, filed on Mar. 18, 2016, provisional application No. 62/301,939, filed on Mar. 1, 2016.

(51) Int. Cl.
*B60B 33/04* (2006.01)
*B60B 33/00* (2006.01)
(Continued)

(52) U.S. Cl.
CPC ............ *B60B 33/0002* (2013.01); *A61G 5/10* (2013.01); *A61G 5/1097* (2016.11);
(Continued)

(58) Field of Classification Search
CPC ..... Y10T 16/182; Y10T 16/19; Y10T 16/202; Y10T 16/204; Y10T 16/205;
(Continued)

(56) References Cited

U.S. PATENT DOCUMENTS

| 4,114,283 A | * | 9/1978 | Spainhour | G01B 5/255 |
| | | | | 33/203.18 |
| 4,852,899 A | * | 8/1989 | Kueschall | A61G 5/00 |
| | | | | 280/250.1 |

(Continued)

FOREIGN PATENT DOCUMENTS

JP   11113970 A   *   4/1999   ....... H01L 23/49531

*Primary Examiner* — Chuck Y Mah
(74) *Attorney, Agent, or Firm* — Norton Rose Fulbright Canada LLP

(57) ABSTRACT

A caster assembly for a wheelchair comprises a stem having a frame clamp at a first end and a fork clamp at a second end, the frame clamp configured to form a frame joint with at least one rotational degree of freedom with a frame portion of the wheelchair, a tightening of the frame clamp securing the stem to the frame portion, the frame joint having a frame rotational axis. A fork unit has a fork portion and a caster rotatably supported by the fork portion, the fork unit having swivel mechanism, and a joint portion forming a rotational joint with the fork clamp of the stem, a tightening of the fork clamp blocking rotation of the rotational joint, the rotational joint having a fork rotational axis. A vector of the fork rotational axis is normal to a fork rotational plane in which the fork rotates relative to the stem, and further wherein the frame rotational axis is not parallel to the fork rotational plane.

19 Claims, 5 Drawing Sheets

(51) Int. Cl.
*A61G 5/10* (2006.01)
*A61G 5/02* (2006.01)

(52) U.S. Cl.
CPC ...... *B60B 33/0039* (2013.01); *B60B 33/0049* (2013.01); *B60B 33/0057* (2013.01); *B60B 33/0068* (2013.01); *A61G 5/02* (2013.01); *B60B 2200/22* (2013.01)

(58) Field of Classification Search
CPC .............. B60B 33/002; B60B 33/0039; B60B 33/0049; B60B 33/0057; B60B 33/0068; B60B 2200/22; A61G 5/1907; A61G 5/10; A61G 5/02
See application file for complete search history.

(56) References Cited

U.S. PATENT DOCUMENTS

| | | | |
|---|---|---|---|
| 8,662,516 B1* | 3/2014 | Slagerman | B60B 33/0021 280/250.1 |
| 2006/0049608 A1* | 3/2006 | Schreiber | A61G 5/10 280/250.1 |
| 2006/0087098 A1* | 4/2006 | Peterson | A61G 5/00 280/304.1 |
| 2008/0143172 A1* | 6/2008 | Borisoff | A61G 5/10 301/111.06 |
| 2011/0221162 A1* | 9/2011 | Ludovici | A61G 5/10 280/250.1 |
| 2012/0169026 A1* | 7/2012 | Golden, Jr. | A61G 5/02 280/250.1 |
| 2013/0009372 A1* | 1/2013 | Willis | A61G 5/02 280/86.5 |

\* cited by examiner

WHEELCHAIR CASTER ASSEMBLY

CROSS-REFERENCE TO RELATED APPLICATIONS

The present application claims priority on U.S. Patent Application Ser. No. 62/301,939, filed on Mar. 1, 2016, and on U.S. Patent Application Ser. No. 62/310,036, filed on Mar. 18, 2016, the content of both of which is inserted herein by reference.

TECHNICAL FIELD

The present application relates to wheelchairs and, more particularly, to various components of a wheelchair assembly.

BACKGROUND ART

Wheelchairs have evolved over the years to become increasingly ergonomic, lightweight, easy to maneuver and to use. However, there remains room for improvement to add additional adjustment possibilities to wheelchairs, and to render them even more convenient to use, notably in the maneuverability, stiffness, balance, but also for moving into or out of the wheelchair, and folding or unfolding the wheelchair for storage.

SUMMARY

It is an aim of the present disclosure to provide a novel wheelchair caster assembly.

Therefore, in accordance with the present disclosure, there is provided a caster assembly for a wheelchair comprising: a stem having a frame clamp at a first end and a fork clamp at a second end, the frame clamp configured to form a frame joint with at least one rotational degree of freedom with a frame portion of the wheelchair, a tightening of the frame clamp securing the stem to the frame portion, the frame joint having a frame rotational axis, and a fork unit having a fork portion and a caster rotatably supported by the fork portion, the fork unit having swivel mechanism, and a joint portion forming a rotational joint with the fork clamp of the stem, a tightening of the fork clamp blocking rotation of the rotational joint, the rotational joint having a fork rotational axis, wherein a vector of the fork rotational axis is normal to a fork rotational plane in which the fork rotates relative to the stem, and further wherein the frame rotational axis is not parallel to the fork rotational plane.

BRIEF DESCRIPTION OF THE FIGURES

The present application relates to wheelchairs and, more particularly, to various components of a wheelchair assembly.

DETAILED DESCRIPTION

Figure 1:
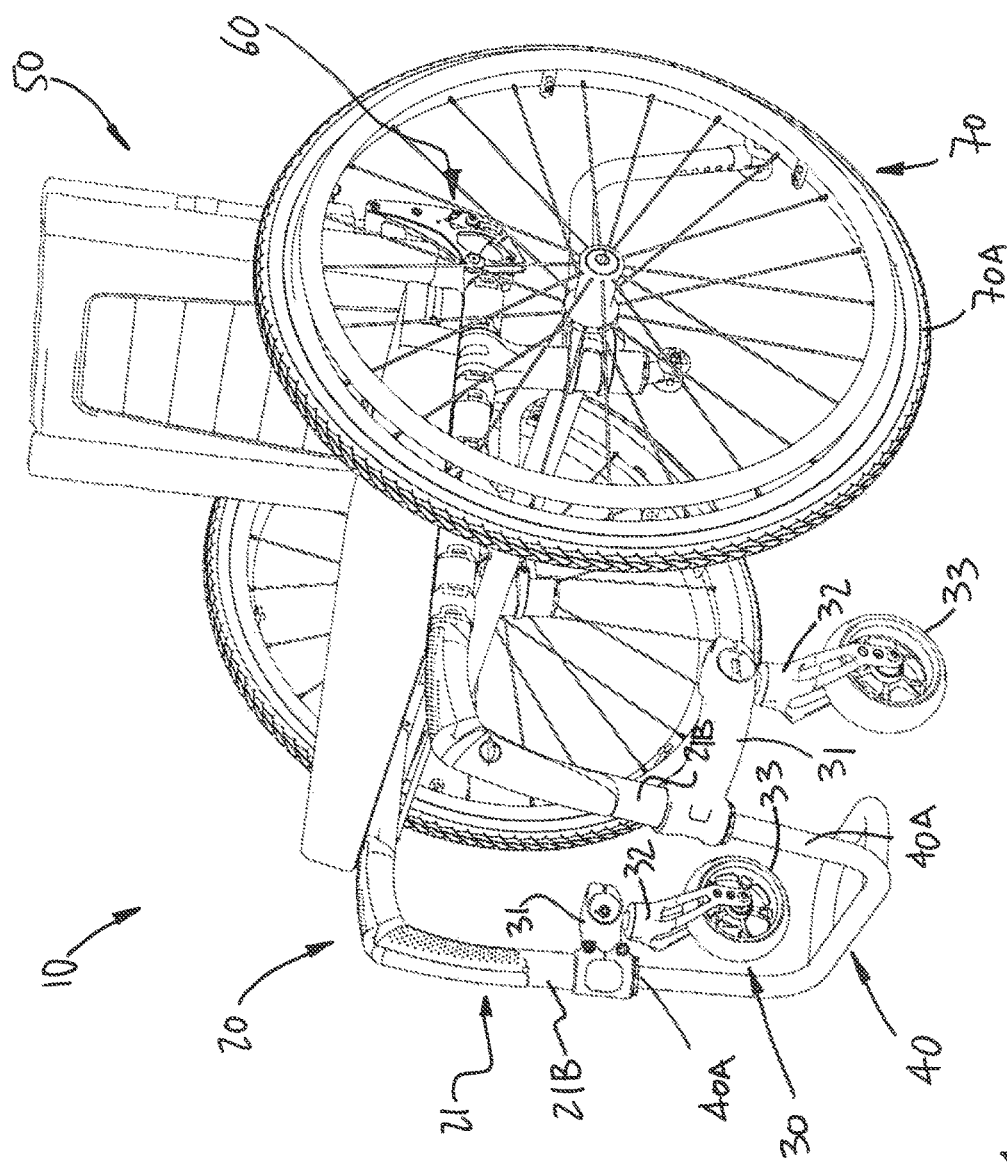
FIG. 1 is a perspective view of a wheelchair assembly with a pair of caster assemblies in accordance with the present disclosure.

Referring to the drawings and more particularly to FIG. 1, there is illustrated a wheelchair assembly at 10, also simply referred to as wheelchair. The wheelchair assembly 10 is of the type having a plurality of other components, including a seat frame 20, a pair of front caster assemblies 30, a footrest 40, a backrest frame 50, bracket assemblies 60 and rear wheel units 70.

The seat frame 20 forms the structure of the wheelchair assembly 20. The seat frame 20 has a pair of tube assemblies 21, a right-side tube assembly and a left-side tube assembly, for instance mirror images of one another. The tube assemblies 21 are shown as having a L-shape. The L-shape is one possible embodiment of the tube assemblies 21, and other shapes include a generally polygonal shape, a U-shape, etc. Although the expression "L-shape" is used, the tube assemblies 21 may appear to be a L rotated by 90 degrees clockwise or counterclockwise, depending on the point of view of the observer of the wheelchair 10 of FIG. 1. Moreover, although a right-angle bend is shown in FIG. 1, other angles may be used.

The tube assemblies 21 may include a tubular member made in any appropriate material, such as carbon fiber, composites, metals (e.g., aluminum, titanium, steel, etc), and combinations thereof. According to an embodiment, the tubular member is a monolithic tube. The tubular member may have a first portion 21A and a second portion 21B. The first portion 21A is generally horizontal when the wheelchair 10 is on its wheels, as in FIG. 1. The expression "generally horizontal" is well depicted in FIG. 1, in that the first portion 21A may or may not be substantially parallel to the ground. It is observed that the first portion 21A is in the seating zone of the wheelchair 10, and may even support a seat of the wheelchair 10, as described hereinafter. The first portion 21A may also support the bracket assemblies 60 and the rear wheel units 70. The second portion 21B is generally vertical or generally upright when the wheelchair 10 is on its wheels, as in FIG. 1. The expression "generally vertical" is also well depicted in FIG. 1, in that the second portion 21B may or may not be substantially perpendicular to the ground. The second portion 21B is in the bottom front zone of the wheelchair 10, and may even support the front caster assemblies 30 and the footrest 40, as described hereinafter. The sectional shape of the second portion 21B may be circular as in FIG. 1.

Figure 2:
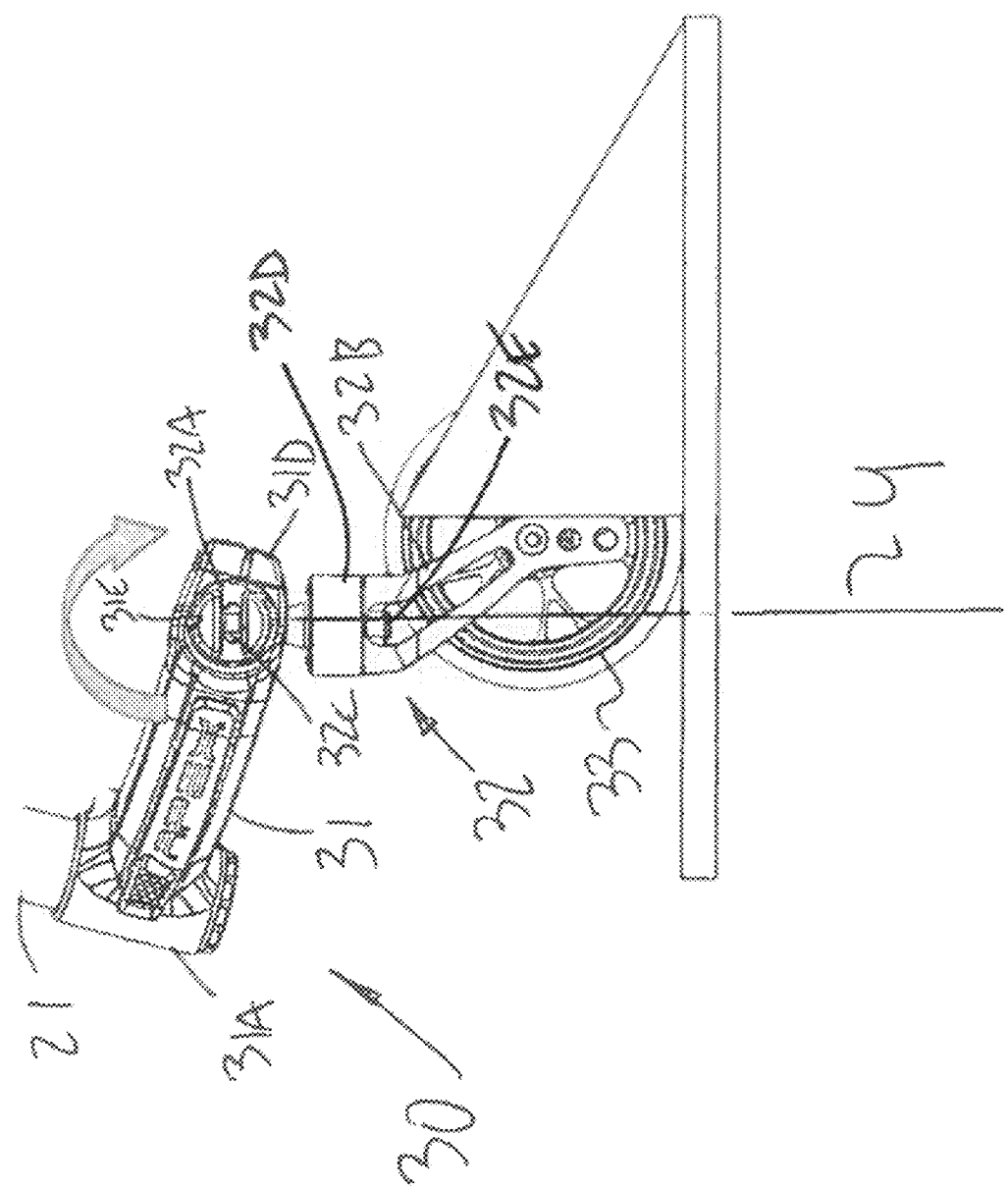
FIG. 2 is a side view of one of the caster assemblies of FIG. 1.
Figure 3:
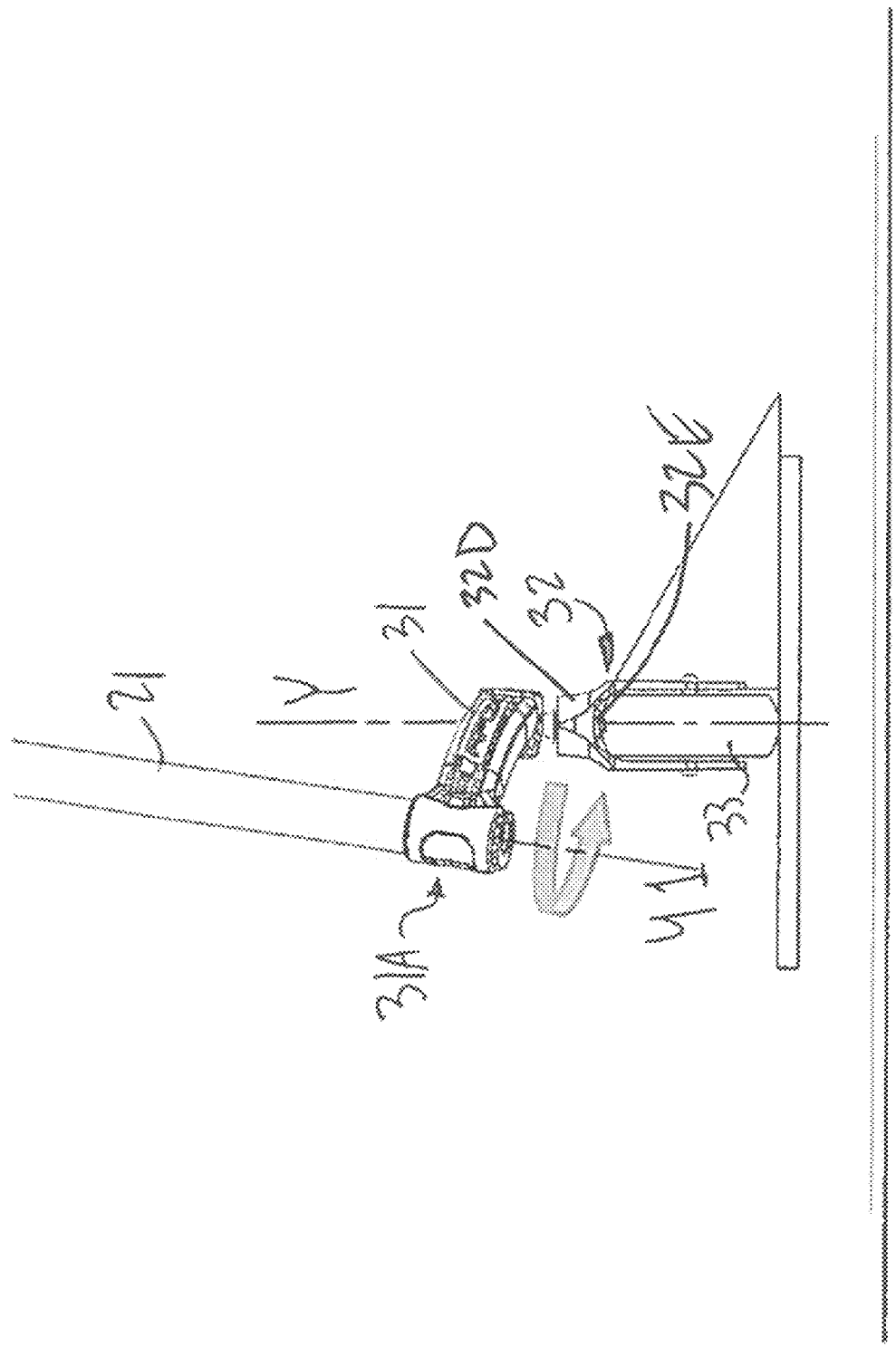
FIG. 3 is a front view of one of the caster assemblies of FIG. 1.

Referring to FIGS. 2-5, one of the front caster assemblies 30 is shown. The front caster assembly 30 may also be known as a front wheel assembly, front caster unit, front roller unit, etc. However, for consistency, reference is made herein to "front caster assembly". The front caster assemblies 30 are generally mirror images of another other, whereby a single one of the front caster assemblies 30 is herein described for simplicity. Each of the front caster assembly 30 has a stem 31, by which it is connected to a respective one of the tubes 21, at a bottom of the second portion 21B. The stem 31 has a clamp 31A at a first end. The clamp 31A may be referred to a frame clamp as it clamps the caster assembly 30 to the frame 20 of the wheelchair 10. The clamp 31A may be a C-shaped clamp, emulating the shape of a C. The clamp 31A may have a pair of rings 31B or a single ring 31B (also known as prongs), that may be tightened by tightening assemblies, for instance bolts 31C and nuts (such as threaded bore in the opposed end of the clamp 31A). When loosened, the clamps 31A therefore enable a translation and rotation of the stem 31 relative to the tubes 21. For reference, the joint formed between the clamps 31A and the second portions 21B of the tubes 21 may be regarded as a frame joint, with the stem 31 moving along and rotating about frame rotational axis Y1 (FIG. 3).

An opposite end of the stem 31 defines another clamp 31D that may be tightened in similar fashion to the clamp 31A. The clamp 31D may be regarded as a fork clamp as it serves to clamp a rotation of the fork unit 32 relative to the stem 31. The clamp 31D forms a cylindrical receptacle 31E, by which a fork unit 32 may be operatively connected to the stem 31. The fork unit 32 has a joint portion, namely a cylindrical member 32A, also known as a barrel 32A at its top end, the barrel 32A received in the circular receptacle 31E. Therefore, the barrel 32A may rotate in the circular receptacle 31E, unless the clamp 31D is tightened to block a rotation of the barrel 32A. The rotational axis may be referred to as fork rotational axis and a vector thereof (i.e., superposed on the fork rotational axis) is normal to a plane of the page in FIG. 2, with a rotational arrow showing its movement. The plane of the page in FIG. 2 may be referred to as fork rotational plane as it is in this plane that the fork unit 32 moves in rotational when the rotational joint formed by the cylindrical receptable 31E and the barrel 32A is not blocked by the clamp 31D. As an alternative embodiment, not shown, the clamp is on the fork unit 32 while the cylindrical joint portion is on the stem 31.

A fork portion 32B projects downwardly from the barrel 32A. A spirit level 32C (e.g., bubble level, level, numerical level, etc) may be mounted to the barrel 32A or to the fork portion 32B, and is perpendicularly aligned with the axis Y and/or with the orientation of the fork portion 32B, to allow an adjustment of the orientation of the Y axis, for instance to reach perpendicularity relative to the ground in the sagittal plane of the wheelchair assembly (see FIG. 2), before tightening the clamp 31D. A wheel 33 (a.k.a., roller, caster, castor, etc) is rotatably held by the fork portion 32B of the fork unit 32. The fork portion 32B is in a swivel arrangement relative to the barrel 32A, so as to rotate about axis Y, by way of a swivel mechanism. Hence, axis Y may be regarded as a swivel rotational axis. In an embodiment, the swivel rotational axis is parallel to the plane of the page of FIG. 2 and thus to the fork rotational plane. According to an embodiment, the fork portion 32B incorporates one of more bearings in its housing 32D, and the barrel 32A has a bolt or shaft 32E rotatably supported by the bearing. In FIG. 2, the shaft 32E is shown as having a nut thereon, for the fork portion 32B to be held captive and in rotating engagement with the shaft 32E.

Referring to FIG. 3, it is shown that the axis Y of the fork unit 32, as defined by the correlation between the stem 31 and the fork unit 32, is not parallel to axis Y1 between the stem 31 and the portion 21A of the tube 21. Moreover, it is also shown in FIG. 3, that the frame rotational axis Y1 is not parallel to the fork rotational plane, in which the axis Y lies. Stated differently, the frame rotational axis Y1 intersects the fork rotational plane. Accordingly, by rotating the stem 31 about the tube 21, it is possible to reach perpendicularity of the Y axis relative to the ground in the frontal plane of the wheelchair assembly 10. With the Y axis being perpendicular to the ground in both the sagittal plane (FIG. 2) and the frontal plane (FIG. 3), the Y axis is normal to a plane of the ground, and the impact of gravity on the swivelling motion may be lessened. The stem 31 has a three-dimensional geometry to allow this. According to an embodiment, the stem 31 may be a forged 3D hollow piece, with an arcuate shape to the stem 31. The stem 31 may have a monocoque construction, with the exception of the tightening assemblies for the clamps 31A and 31D. Also, the gaps of the clamps 31A and 31D, which gaps serve to tighten or loosen the clamps 31A and 31D, may be sized relative to the diameters of the tube 21 and of the barrel 32A, respectively, for the clamps 31A and 31D to remain in elastic deformation when tightened. A native gap size (in normal unloaded state) is large enough to allow movement of the stem 31 along and about the tube 21, or rotation of barrel 32A.

Figure 4:
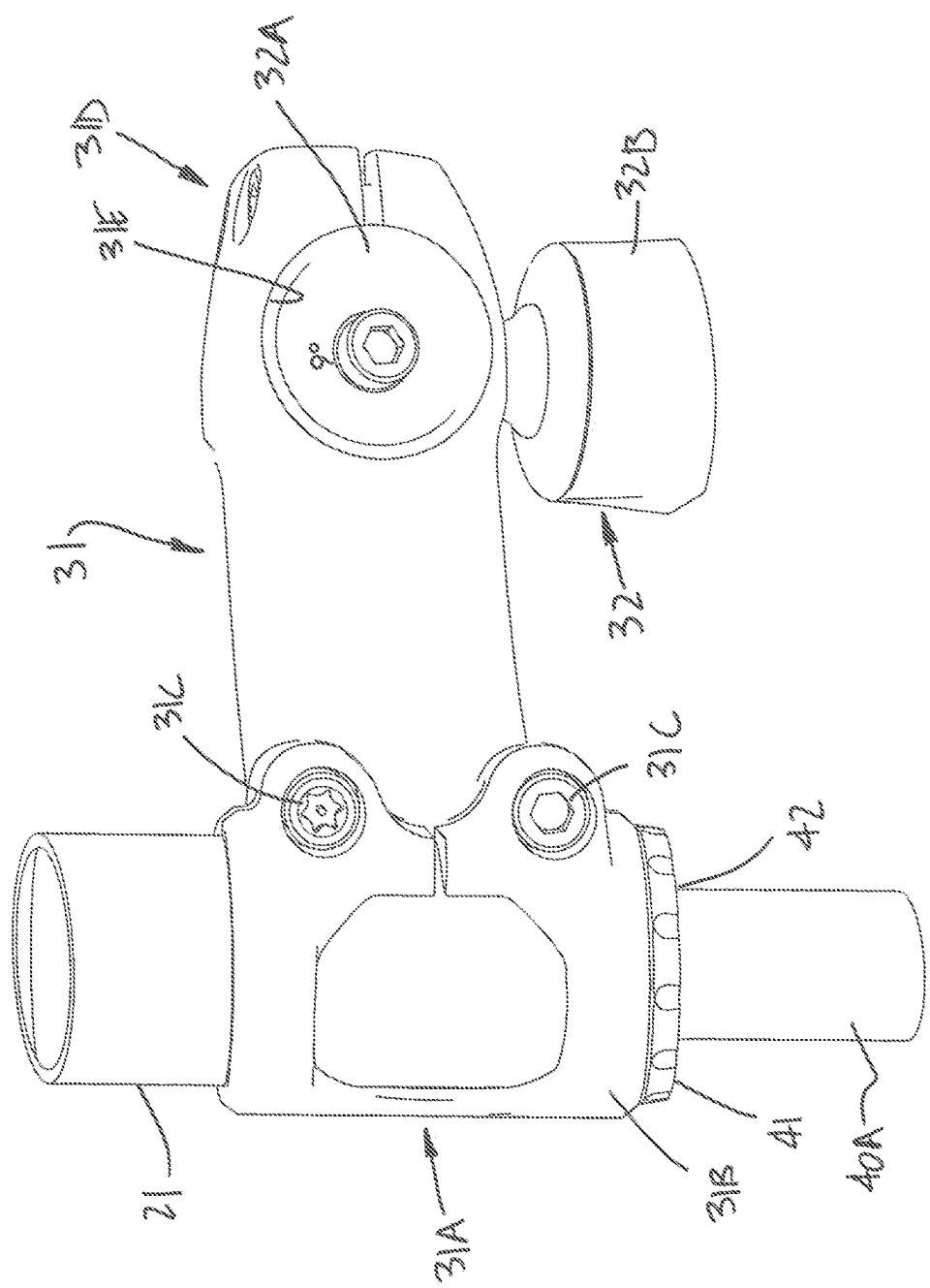
FIG. 4 is an enlarged perspective view of a stem of one of the caster assemblies of FIG. 1.
Figure 5:
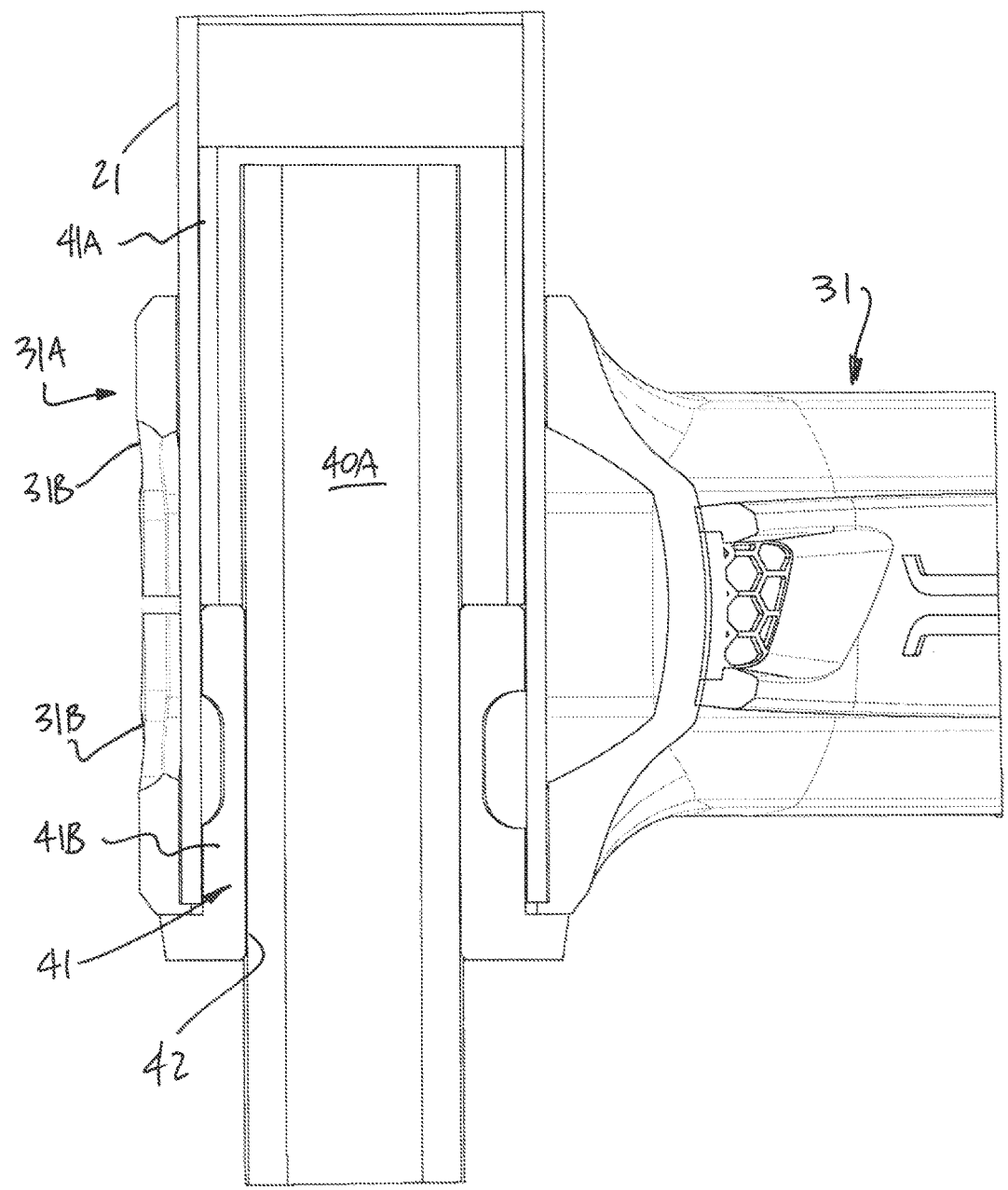
FIG. 5 is a sectional view of the stem of FIG. 4 showing a clamping ring for footrest thereof.

Referring concurrently to FIGS. 1, and 5, one of many contemplated configurations of the footrest (a.k.a., footplate) is shown at 40. The footrest 40 is shown as a monolithic tubular assembly, but other configurations are considered. For example, the footrest 40 may be a combination of tubes with a footplate, etc. In the illustrated, the footrest 40 therefore has a pair of upwardly-oriented tube portions 40A, by which it is connected to the seat frame 20. In an embodiment, the tube portions 40A are small enough to be inserted in open ends of the second portions 21B of the tubes 21 of the seat frame 20, as illustrated in FIGS. 4 and 5. In this embodiment, a clamping ring 41 may have a cylindrical connector portion 41A inserted in the open end of the second portions 21B of each of the tubes 21, in axial alignment with a lower one of the rings 31B of the clamp 31A, in stem 31. The camping ring 41 may therefore rotate relative to the frame tube 21, due to the complementary cylindrical shapes. The cylindrical connector portion 41A may further include an interface sleeve 41B that is configured for sliding engagement with the tube portions 40A. The interface sleeve 41B may also elastically deform to apply pressure against the tube portion 40A to prevent its axial movement. In that way, a clamping of the ring 31B may apply pressure to the tube portion 40A, via clamping ring 41, to lock the footrest 40 in position. Stated differently, the stem 31 of the front caster assembly 30 may additionally or optionally serve the function of allowing a height adjustment for the footrest 40. To assist in the clamping, a slot may be defined in the second portion 21B of the tube 21, upward from the open end of the tube 21. The slot assists in the elastic deformation of the bottom end of the tube 21 to press against the tube portion 40A so as to block its movement.

As observed in FIG. 4, the clamping ring 41 may have a flange head 41C with a hole 42, provided to receive the tube portion 40A. The hole 42 is aligned and rotates with the cylindrical connector portion 41A and/or interface sleeve 41B, such that the tube portion 40A is received therein when slid into the hole 42. The hole 42 may be eccentrically positioned relative a circular body of the flange head 41C and/or to the cylindrical connector portion 41A of the clamping ring 41. This eccentric position is a feature provided to enable a tapering relation between the tubes 21. The clamping ring 41 may rotate as the tube portions 40 are slid thereinto, to adjust to a spacing between the tube portions 40A. Indeed, by rotating either or both of the clamping rings 41, a distance between the holes 42 is adjusted. Once a suitable depth of insertion is reached, the clamps 31A may lock the footrest 40 to the frame 20.

Accordingly, during assembly, both of the clamps 31A and 31D are loosened, to respectively allow a rotation of the stem 31 relative to the tube 21, and of the fork unit 32 relative to the stem 31. A triangular square may be used when rotating the stem 31 to ensure that the fork portion 32B is perpendicular to the ground, as in FIG. 3, at which point the clamp 31A may be tightened. The rotation of the fork unit 32 may be guided by the spirit level 32C to reach the arrangement of FIG. 2. The adjustment mentioned above may be done sequentially, in any order, etc.

The invention claimed is:

1. A caster assembly for a wheelchair comprising:
   a stem having a frame clamp at a first end, the frame clamp configured to form a frame joint with at least one rotational degree of freedom with a frame portion of the wheelchair, a tightening of the frame clamp securing the stem to the frame portion, the frame joint having a frame rotational axis, and
   a fork unit having a fork portion and a caster rotatably supported by the fork portion such that the caster rotates about a caster rotational axis when rolling on a ground, the fork unit having swivel mechanism for the fork portion and the caster to swivel about a swivel rotational axis relative to the ground,
   a rotational joint between the fork unit and the stem,
   a fork clamp in the rotational joint, a tightening of the fork clamp blocking rotation of the rotational joint, the rotational joint having a fork rotational axis,
   wherein a vector of the fork rotational axis is normal to a fork rotational plane in which the fork rotates relative to the stem, and further wherein the frame rotational axis is not parallel to the fork rotational plane, and
   further the caster assembly has at most two rotational degrees of freedom from the frame clamp to the fork portion.

2. The caster assembly according to claim 1, wherein the rotational joint is formed by a joint portion of the fork unit being a cylindrical member rotatably received in the fork clamp, the fork clamp being at a second end of the stem.

3. The caster assembly according to claim 2, wherein the cylindrical member supports a level, the level indicative of an orientation of the fork portion relative to the ground.

4. The caster assembly according to claim 2, wherein the swivel mechanism is between the joint portion and the fork portion.

5. The caster assembly according to claim 4, wherein a shaft of the swivel mechanism projects from the joint portion.

6. The caster assembly according to claim 1, wherein the swivel rotational axis of the swivel mechanism is parallel to the fork rotational plane.

7. The caster assembly according to claim 1, wherein at least one of the frame clamp and the fork clamp is a C-clamp.

8. The caster assembly according to claim 7, wherein the frame clamp is a C-clamp having two C-clamp rings, each C-clamp ring being tightened individually.

9. The caster assembly according to claim 1, further comprising a clamping ring configured to be at least partially received in an open end of the frame portion of the wheelchair in axial alignment with the frame clamp, the clamping ring configured to receive a footrest portion therein, said tightening of the frame clamp resulting in a tightening of a portion of the clamping ring on the footrest portion to fix the footrest portion to the frame portion.

10. The caster assembly according to claim 9, wherein the clamping ring includes an interface sleeve in axial alignment with the frame clamp, said tightening of the frame clamp pressing the interface sleeve against the footrest portion.

11. The caster assembly according to claim 9, wherein the clamping ring is rotatable relative to the frame portion, and further wherein a hole in the clamping ring for receiving the footrest portion is eccentrically positioned in the clamping ring to change a position of the hole relative to the frame portion by rotation of the clamping ring.

12. A wheelchair comprising:
   a frame portion supporting a seat and a pair of rear wheels;
   a pair of caster assemblies, each of the caster assemblies comprising:
   a stem having a frame clamp at a first end, the frame clamp forming a frame joint with at least one rotational degree of freedom with the frame portion of the wheelchair, a tightening of the frame clamp securing the stem to the frame portion, the frame joint having a frame rotational axis, and
   a fork unit having a fork portion and a caster rotatably supported by the fork portion such that the caster rotates about a caster rotational axis when rolling on a ground, the fork unit having swivel mechanism for the fork portion and the caster to swivel about a swivel rotational axis relative to the ground,
   a rotational joint between the fork unit and the stem,
   a fork clamp in the rotational joint, a tightening of the fork clamp blocking rotation of the rotational joint, the rotational joint having a fork rotational axis,
   wherein a vector of the fork rotational axis is normal to a fork rotational plane in which the fork rotates relative to the stem, and further wherein the frame rotational axis is not parallel to the fork rotational plane.

13. The wheelchair according to claim 12, wherein the rotational joint is formed by a joint portion of the fork unit being a cylindrical member rotatably received in the fork clamp, the fork clamp being at a second end of the stem.

14. The wheelchair according to claim 13, wherein the swivel mechanism is between the joint portion and the fork portion.

15. The wheelchair according to claim 12, wherein the swivel rotational axis of the swivel mechanism is parallel to the fork rotational plane.

16. The wheelchair according to claim 12, wherein at least one of the frame clamp and the fork clamp is a C-clamp.

17. The wheelchair according to claim 12, further comprising a clamping ring configured to be at least partially received in an open end of the frame portion of the wheelchair in axial alignment with the frame clamp, the clamping ring configured to receive a footrest portion therein, said tightening of the frame clamp resulting in a tightening of a portion of the clamping ring on the footrest portion to fix the footrest portion to the frame portion.

18. The wheelchair according to claim 17, wherein the clamping ring includes an interface sleeve in axial alignment with the frame clamp, said tightening of the frame clamp pressing the interface sleeve against the footrest portion.

19. The wheelchair according to claim 17, wherein the clamping ring is rotatable relative to the frame portion, and further wherein a hole in the clamping ring for receiving the footrest portion is eccentrically positioned in the clamping ring to change a position of the hole relative to the frame portion by rotation of the clamping ring.

\* \* \* \* \*